May 13, 1924.
H. GLASER
PISTON
Filed July 24, 1922
1,493,746
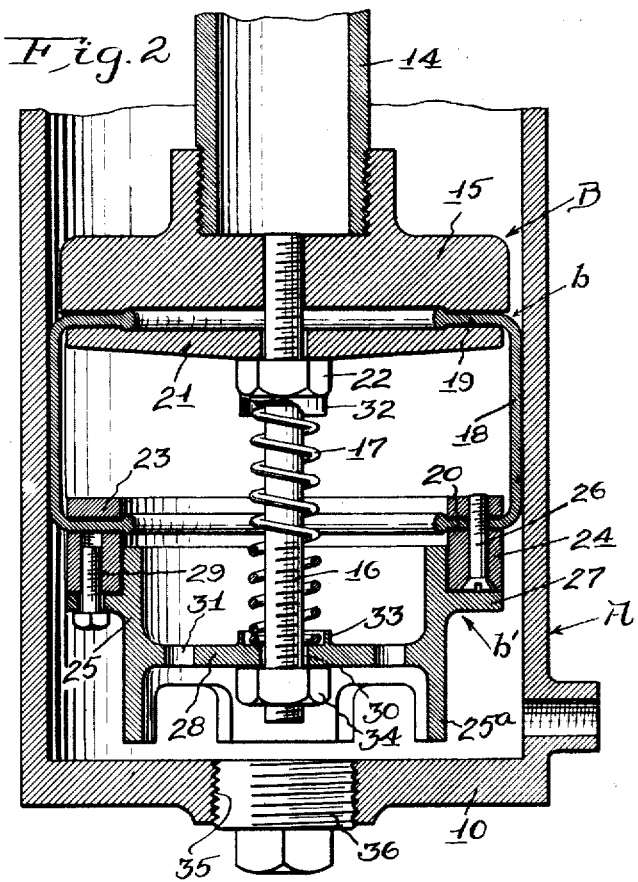
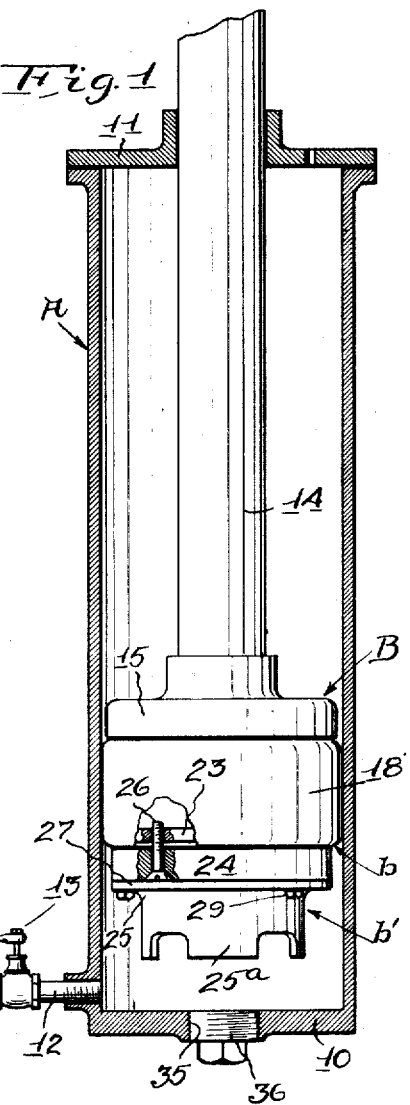
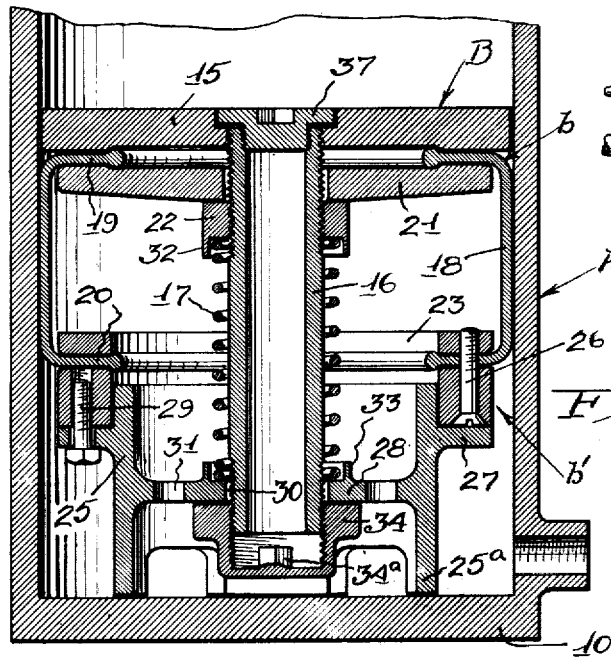
Inventor
Hugo Glaser
By Bradbury & Caswell
Attorneys Patented May 13, 1924.

1,493,746

UNITED STATES PATENT OFFICE.

HUGO GLASER, OF ST. PAUL, MINNESOTA.

PISTON.

Application filed July 24, 1922. Serial No. 577,006.

*To all whom it may concern:*

Be it known that I, HUGO GLASER, a citizen of the United States, residing in St. Paul, in the county of Ramsey and State of Minnesota, have invented a new and useful Improvement in Pistons, of which the following is a specification.

My invention relates to improvements in pistons.

Broadly, it is my object to provide a pressure tight piston for the cylinders of hoisting mechanism, sausage stuffing devices and the like, which is simple and durable in construction and designed to permit of free retracting movement.

More specifically it is my object to supply a piston to be propelled in a cylinder by the pressure of air, oil, water or other suitable operating fluid, said piston including a packing ring adapted to be expanded laterally against the cylinder walls by pressure of the operating fluid on the power stroke of the piston.

Another object is to provide a piston, as above, the same including means for tensing the ring longitudinally to prevent the buckling thereof against the cylinder walls on the return stroke of the piston.

With the foregoing and other objects in view, which will appear in the following description, the invention resides in the novel combination and arrangement of parts and in the details of construction hereinafter described and claimed.

In the drawings, Fig. 1 illustrates an embodiment of my invention, the same showing a cylinder in section and a piston in elevation therein, a portion of the piston being broken away to illustrate structural arrangement; Fig. 2 is a detail sectional view illustrating the form of piston shown in Fig. 1 and Fig. 3 is a detail sectional view illustrating an alternate form of piston.

Referring to the drawings, I have used the reference letter A to indicate a cylinder and B to designate the piston therein. The cylinder A may have ends 10 and 11, and a conduit 12 to direct a propelling medium into the cylinder. This conduit may also serve as an outlet for said medium and may be fitted with a valve 13 of ordinary construction for closing the conduit, directing the propelling medium into the cylinder or permitting the escape of said medium from the cylinder. The piston B may have a plunger rod 14 (Figs. 1 and 2) attached thereto and passing through one end of the cylinder for transmitting the movement of the piston to associated mechanism. In various hoisting mechanisms, the use of the plunger rod 14 is required, but in other structures, including sausage stuffing machines, the plunger rod is not used (see Fig. 3).

My improved piston includes an annular headblock 15, an axial stud bolt 16 threaded in the headblock, a flexible packing ring $b$ joined at one annular margin to said headblock, a tailpiece $b'$ carried on the opposite annular margin of said ring and guided by the stud bolt and an expansion spring 17 operating against the headblock and tailpiece to stretch the ring $b$ longitudinally. Said packing ring $b$ is preferably molded rubber or a composition of rubber and fabric having a body 18 with inturned annular margins 19 and 20 thereon. The margin 19 of the packing ring $b$ is gripped against the headblock 15 by means of a disc 21 within said packing ring, said disc being centrally apertured to slide upon the stud bolt 16 and pressed in clamping relation against said margin 19 by means of a nut 22 threaded on said stud bolt 16. The tailpiece $b'$ is a composite structure including binder rings 23 and 24 and an end bearing 25. The binder rings 23 and 24 are clamped together with screws 26 to grip the margin 20 of the packing ring $b$ therebetween. The end bearing 25 is a sleeve-like casting fitting at one end within the outer binder ring 24, said casting having an external annular flange 27 thereon and a web 28 therein. Bolts 29 reaching through the flange 27 and threaded in the ring 24 join the end bearing 25 with the binder rings 23 and 24. A central bore 30 in the web 28 slidably receives the stud bolt 16, while apertures 31 in said web bring the interior of the packing ring $b$ into communication with the fluid receiving bore of the cylinder A. Opposed cups 32 and 33 on the nut 22 and web 28 receive the ends of the expansion spring 17 encircling the stud bolt 16 between said nut and web. A stop nut 34 threaded on the stud bolt 16 limits the action of the spring 17. Pressure of a fluid operating medium entering the cylinder A expands the packing ring $b$ laterally against the action of the spring 17, thus pressing the body 18 of said ring against the cylinder walls and supplying a tight fit between piston and cylinder.

Continued introduction of the propelling medium to the cylinder drives the piston B upward. Arresting the inflow of said medium results in suspending the piston within the cylinder, while releasing the medium from said cylinder is attended by the fall of said piston. During the escape of the propelling fluid from the cylinder and without provision for reinforcing the body 18 of the packing ring *b*, said ring is subject to buckling against the cylinder walls with the resultant "sticking" of the piston in the cylinder. Such buckling of the packing ring body 18 is injurious thereto and requires considerable effort in retracting or lowering the piston B. Said spring 17 tends to stretch the body 18 of the packing ring *b* longitudinally and prevents such buckling thereof. Before placing the piston B within the cylinder A the stop nut 34 is retracted so that the full force of the spring 17 is exerted in tensing the packing ring body 18 longitudinally. This restricts the diameter of the piston and permits of ready assembling. After the piston is placed within the cylinder, the nut 34 is turned to limit the thrust of the spring 17, said nut being reached by a tool inserted through a threaded bore 35 in the cylinder head 10, said bore being normally closed by means of a threaded plug 36 (Figs. 1 and 2). The action of the spring 17 is thus limited by the nut 34, to avoid undue tensing of the piston ring body and consequent leakage of the piston during its fall. Said nut 34 is advanced from time to time to further limit the action of the spring 17 as the packing ring wears. In the alternate form shown in Fig. 3, the stud bolt 16 is hollow, the same extending through the headblock 15 and being covered with a plug 37. Instead of reaching the adjusting nut 34 through a bore in the cylinder head 10 as in Figs. 1 and 2, the nut 34 is adjusted by means of a socket wrench reaching through the stud bolt 16. The plug 37 is, of course, removed to permit the insertion of a wrench into the bore of the stud bolt 16, the nut 34 having means of coaction with a wrench such as the angular boss 34ᵃ (Fig. 3). The skirt 25ᵃ of the end bearing 25 extends beneath the lower end of the stud bolt 16 and adjusting nut 34 thereon. As the piston B settles to the bottom of the cylinder, said skirt 25ᵃ strikes the end 10 thereof and arrests the movement of the tailpiece *b'*. The headblock 15 continues to settle until the stud bolt 16, Fig. 2 (nut 34, Fig. 3), strikes said end 10 of the cylinder. During the movement of the headpiece 15 with respect to the tailpiece *b'*, following the arresting of the latter, the spring 17 is compressed and the packing ring body 18 is pressed against the cylinder walls. This compression of the spring 17 cushions the fall of the piston and the tight fitting packing ring body prevents leakage of the propelling medium upon the initial introduction thereof preparatory to the following power stroke of the piston B.

Changes in the specific form of my invention, as herein disclosed, may be made within the scope of what is claimed without departing from the spirit of my invention.

Having described my invention, what I claim as new and desire to protect by Letters Patent is:

1. The combination with a cylinder, of a piston therein comprising a headblock, a tailpiece, a flexible packing ring joined at its opposite margins with the headblock and tailpiece, said ring being adapted to be expanded laterally against the cylinder walls by pressure of a fluid medium for propelling the piston, an axial extension carried by the headblock and forming a guide for the tailpiece, an expansion spring encircling said extension and interposed between the headblock and tailpiece and an adjustable stop on said extension to limit the expansion of the spring, said spring serving to tense the packing ring longitudinally and also to cushion the impact of the piston against the end of the cylinder, said extension serving as a stop for the piston at the extremity of its return stroke.

2. The combination with a cylinder, of a piston therein comprising a headblock, a tailpiece, a flexible packing ring joined at its opposite margins with the headblock and tailpiece, said ring being adapted to be expanded laterally against the cylinder walls by pressure of a fluid medium for propelling the piston and a spring operating between the headblock and tailpiece to tense the packing ring longitudinally and also to cushion the impact of the piston against the end of the cylinder.

3. The combination with a cylinder of a piston therein including a headblock, a flexible packing ring joined at one annular margin thereof with the headblock, a floating binder element attached to the other annular margin of said ring, said ring being adapted to be expanded laterally against the cylinder walls by pressure of a fluid medium for propelling the piston, and yielding means operating between the headblock and said binder element to tense said ring longitudinally.

4. The combination with a cylinder of a piston therein including a headblock, a flexible packing ring joined at one annular margin thereof with the headblock, a floating binder element attached to the other annular margin of said ring, said ring being adapted to be expanded laterally against the cylinder walls by pressure of a fluid medium for propelling the piston and adjustable, yielding means operating between the headblock and said binder element to tense said ring longitudinally.

5. The combination with a cylinder, of a piston therein including a headblock, a floating binder element, a flexible packing ring joined at its opposite margins with said headblock and binder element, said ring being adapted to be expanded laterally against the cylinder walls by pressure of a fluid medium for propelling the piston, a spring operating between the headblock and binder element to tense the packing ring longitudinally, also to yieldingly impede the fall of the piston at the lower end of the cylinder, and a stop associated with the headblock, said stop being adapted to arrest the fall of the piston and limit the cushioning operation of said spring.

6. The combination with a cylinder, of a piston therein including a headblock, a floating binder element, a flexible packing ring joined at its opposite margins with said headblock and binder element, said ring being adapted to be expanded laterally against the cylinder walls by pressure of a fluid medium for propelling the piston, a spring operating between the headblock and binder element to tense the packing ring longitudinally, also to yieldingly impede the fall of the piston at the lower end of the cylinder and an adjustable stop associated with the headblock, said stop being adapted to arrest the fall of the piston and variously limit the cushioning operation of said spring.

7. The combination with a cylinder, of a piston therein comprising a headblock, a floating binder element and a flexible packing ring joined at its opposed annular margins with said floating binder element, said packing ring being adapted to be expanded laterally against the cylinder walls by pressure of a fluid medium for propelling the piston.

In testimony whereof, I have signed my name to this specification.

HUGO GLASER.

Certificate of Correction.

It is hereby certified that in Letters Patent No. 1,493,746, granted May 13, 1924, upon the application of Hugo Glaser, of St. Paul, Minnesota, for an improvement in "Pistons," an error appears in the printed specification requiring correction as follows: Page 3, line 41, claim 7, strike out the words "floating binder element" and insert instead the words *headblock and tailpiece;* and that the said Letters Patent should be read with this correction therein that the same may conform to the record of the case in the Patent Office.

Signed and sealed this 15th day of July, A. D. 1924.

[SEAL.]
THOMAS E. ROBERTSON,
*Commissioner of Patents.*